United States Patent [19]

Carey

[11] Patent Number: 4,498,376
[45] Date of Patent: Feb. 12, 1985

[54] PIZZA COOKING UTENSIL

[76] Inventor: Thomas F. Carey, P.O. Box 992, Miami, Okla. 74354

[21] Appl. No.: 528,940

[22] Filed: Sep. 2, 1983

[51] Int. Cl.³ .............................................. A47J 37/10
[52] U.S. Cl. ....................................... 99/345; 99/352; 99/422; 99/426; 426/509
[58] Field of Search ................. 99/345, 352, 422, 426, 99/428, 467, 482; 426/509, 510; 222/518, 545, 559; 126/380

[56] References Cited

U.S. PATENT DOCUMENTS

| 831,088 | 9/1906 | McCaughey | 99/345 |
| 1,192,802 | 7/1916 | Trescott | 426/509 |
| 2,481,711 | 9/1949 | Bemis | 99/345 X |

FOREIGN PATENT DOCUMENTS

| 1287075 | 8/1972 | United Kingdom | 99/345 |
| 707557 | 1/1980 | U.S.S.R. | 99/352 |

Primary Examiner—Billy J. Wilhite
Attorney, Agent, or Firm—Head, Johnson & Stevenson

[57] ABSTRACT

A pizza cooking utensil comprising a housing having one open end adapted to be disposed adjacent the hot surface of a cooking grill and the opposite end closed by a removable cover, a partition provided in the interior of the housing separating the interior of the housing into two chambers, one chamber being adapted for surrounding or encasing a pizza serving to be cooked and the other chamber being a moisture chamber or water reservoir chamber, valves interposed between the two chambers and operable to selectively admit a quantity of moisture into the chamber surrounding the pizza section for facilitating the rapid and efficient cooking of the pizza section. The utensil eliminates the need for the usual relatively large and expensive pizza oven and renders the serving of pizza in a fast food establishment a feasible operation.

3 Claims, 6 Drawing Figures

PIZZA COOKING UTENSIL

BACKGROUND OF THE INVENTION

1. Field of the Invention.

This invention relates to improvements in cooking utensiles and more particularly, but not by way of limitation, to a device for facilitating the cooking of pizza.

2. Description of the Prior Art.

Pizza is a very popular food product, and there are many establishments particularly designed and devoted to the cooking and serving of pizza. One problem with the product, is that it usually requires a relatively large oven facility to bake or cook the pizza, and the cooking procedure normally requires a considerable period of time. This renders the product substantially unavailable for the many fast food restaurants and eating establishments in widespread use today because of the expense of the oven construction, and the time required for preparing or cooking the pizza. In addition, a pizza is usually a relatively large food product in the form of a pie, or the like, which may serve several persons, or which may provide several servings for a single person to consume. Snack foods are becoming increasingly popular, also, and the usual person desiring such a food product normally does not wish to consume an entire pizza, but rather would prefer a single serving size food product. The heating of a single serving of pizza severed from a complete or whole pizza pie, or the maintaining of a single pizza serving in edible form usually presents a problem, and as a result, single servings of pizza are relatively unavailable in any practical and palatable manner.

SUMMARY OF THE INVENTION

The present invention contemplates a novel pizza cooking utensil particularly designed and constructed for overcoming the foregoing disadvantages. The novel pizza cooker comprises a housing having one open end adapted to be disposed against the hot surface of the grill, griddle, or the like, surrounding a single pizza serving, which is also disposed on the surface of the grill. The housing is provided with a first compartment surrounding the pizza for retaining the heat from the grill therein in order to direct the heat to the pizza from a 360° orientation with respect thereto. A second compartment is provided in the housing for receiving a supply of liquid, such as water therein, and suitable nozzle means or jet means is interposed between the two chambers whereby the moisture from the water chamber may be selectively injected into the pizza containing chamber for facilitating the rapid cooking of the pizza. The housing is constructed from a suitable material, such as metal, which readily conducts heat from the hot surface of the grill whereby the moisture added to the pizza containing chamber may be in the form of steam and for creating an oven-like atmosphere or environment for the pizza being cooked therein. The novel housing provides a rapid cooking of a single serving of pizza and renders the pizza feasible for serving in a fast food type establishment. The novel pizza cooking utensil is simple and efficient in operation and economical and durable in construction.

DETAILED DESCRIPTION OF THE PREFERRED EMBODIMENTS

Figure 1:
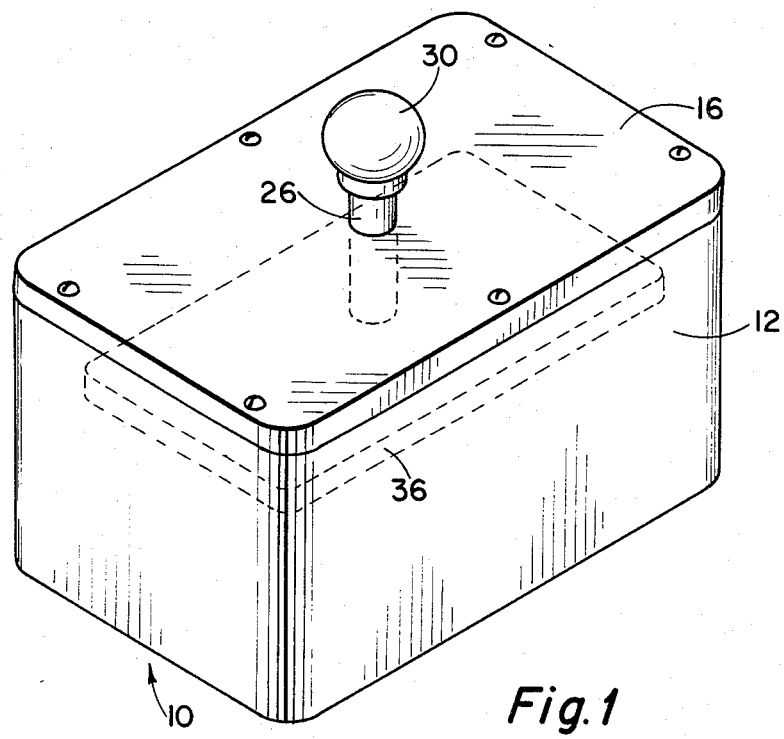
FIG. 1 is a perspective view of a pizza cooking utensil embodying the invention.

Referring to the drawings in detail, and particularly FIGS. 1 through 5, reference character 10 generally indicates a pizza cooking utensil comprising a housing 12 constructed from a suitable heat conductive material, such as metal and having one side 14 thereof open and the opposite end closed by a removable cover plate 16. A wall or partition member 18 extends across the interior of the housing 12 in spaced relation between the cover 16 and open end 14, separating the interior of the housing 12 into first and second chambers 20 and 22. A centrally disposed bore 24 is provided in the cover 16 for receiving a removable stem means 26 therein, and it is preferable to provide suitable sealing means such as an O-ring 28 between the outer periphery of the stem means 26 and the bore 24 for precluding leakage of fluid therebetween. It is desirable to provide a hand grip means 30 on the outer end of the stem means 26 for facilitating manipulation of the utensil 10, as will be hereinafter set forth.

At least one, and preferably a plurality of tapered bores or ports 32 are provided in the partition or wall 18 to permit selective communication between the chambers 20 and 22. A valve stem means 34 is reciprocally disposed in each of the ports 32, and extending into connection with a reciprocal plate means 36 disposed within the chamber 22. The plate means 36 is supported by means of a plurality of spaced support posts 38 which are secured to the partition 18 in any suitable manner, such as by a threaded engagement therewith. The posts 38 extend slidably through bores 40 provided in the plate means 36 in alignment with the posts, and suitable helical spring means 42 is disposed around the outer periphery of each post 38 and anchored between the plate 36 and partition 18 for supporting the plate 36 in a normally spaced position with respect to the partition 18. This normal raised position for the plate 36 with respect to the partition 18 provides a normally closed position for the tapered valves 34 in the respective tapered bores 32.

Figure 5:
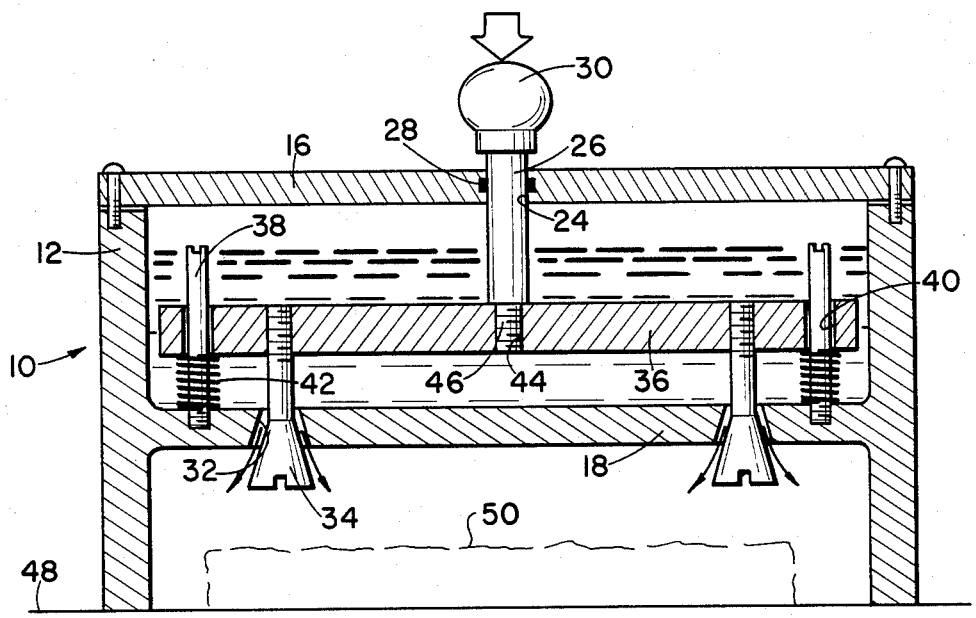
FIG. 5 is a view similar to FIG. 4 showing the utensil in a position for dispensing moisture from one chamber to another in the utensil.

A centrally disposed threaded bore 44 is provided in the plate means 36 for receiving a threaded stud means 46 provided on the inwardly directed end of the stem means 26. In this manner the plate means 36 is connected with the stem means, and when it is desired to open the ports 32 to establish communication between the chambers 20 and 22, the plate means 36 may be moved in a direction toward the partition 18 and against the force of the springs 42 for moving the tapered valve stems 34 out of engagement with the tapered bores 32, as shown in FIG. 5. Of course, the pins or posts 38 guide the movement of the plate means 36 in both a downward and upward movement thereof as viewed in the drawings.

In use, the stem means 26 may be withdrawn or removed from the bore 24 by unthreading the stem from engagement with the plate 36 and manually pulling the stem away from the engagement with the bore 24. A quantity of fluid, such as water, may be deposited in the chamber 22 through the open bore 24, and the stem means 26 may be returned to its position within the bore 24 and connected with the plate 36. The stem means 26 and hand grip means 30 may then be utilized as a handle for manipulation of the utensil 10.

The entire utensil 10 may be placed on the surface 48 of a hot grill, griddle, or the like, and surrounding or encasing a single serving size pizza 50. The heat radiating from the hot surface 48 is "captured" within the chamber 20 for concentration on the pizza serving 50. In addition, the material of the housing 12 becomes hot from the physical engagement thereof with the hot surface 48 and radiates additional heat to the pizza serving 50, thus creating an environment for the pizza generally similar to that encountered in the usual pizza oven, but resulting in a relatively rapid cooking of the food product. It is usually desirable to add a quantity of moisture to the chamber 20 during the heating or cooking of the pizza 50, and when the addition of water, or the like is required, the stem means 26 may be manually moved in a direction toward the partition 18 for opening of the valves 34–32 to establish communication between the chambers 20 and 22. The moisture or water contained in the chamber 22 may be injected by gravity into the chamber 20, and normally the spacing of the ports 32 is such that the moisture emitting therefrom avoids the pizza 50 itself and drops on the hot surface 48. The engagement of the moisture with the hot surface creates steam within the chamber 20 for further faciliating the efficient and rapid cooking of the pizza 50.

Figure 6:
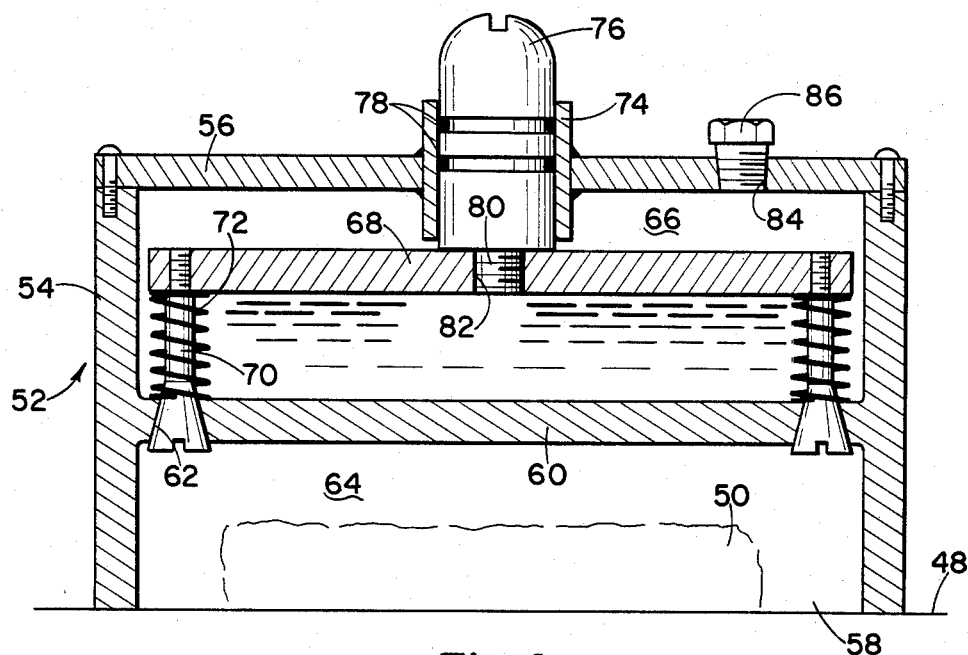
FIG. 6 is a sectional elevational view of a modified pizza cooking utensil embodying the invention.
Figure 3:
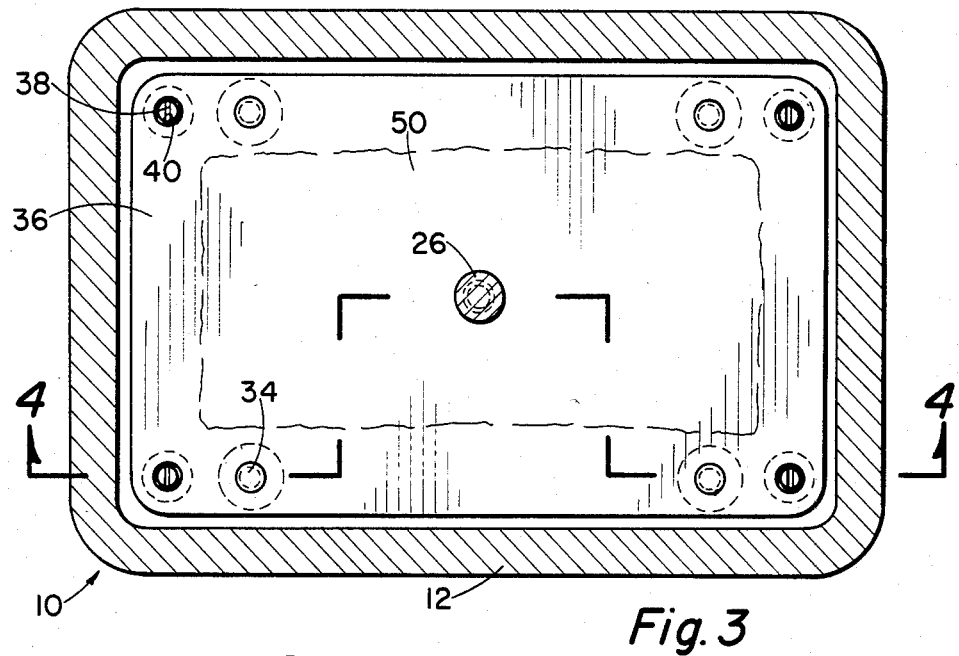
FIG. 3 is a sectional plan view of the pizza cooking utensil shown in FIGS. 1 and 2.
Figure 2:
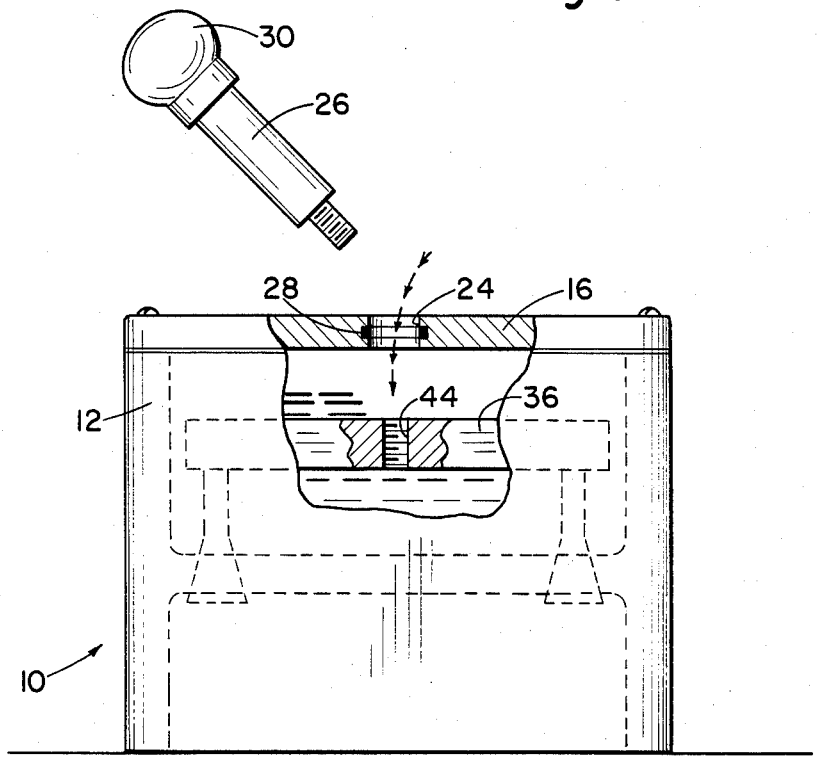
FIG. 2 is a side elevational view, partly in section, of the pizza cooking utensil shown in FIG. 1.
Figure 4:
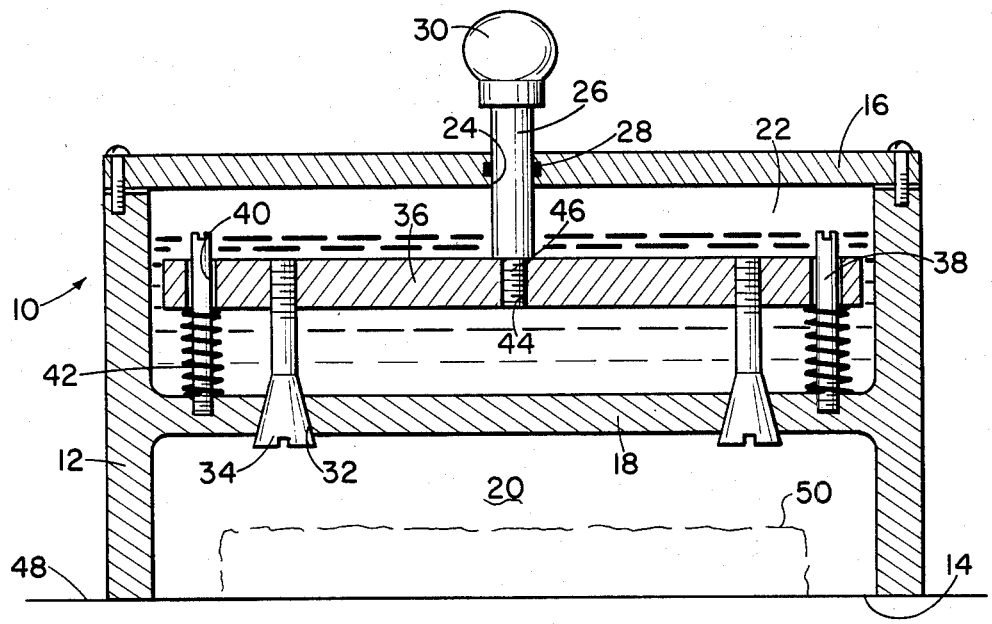
FIG. 4 is a view taken on line 4—4 of FIG. 3.

Referring now to FIG. 6, reference character 52 generally indicates a modified pizza cooking utensil embodying the invention and comprising a housing 54 generally similar to the housing 12. One end of the housing 54 is closed by a removable cover means 56 and the opposite end 58 thereof is open. A partition 60 is provided in the interior of the housing 54 in spaced relation between the cover 56 and open end 58, and is provided with at least one and preferably a plurality of spaced tapered ports 62 similar to the ports 32. The partition 50 separates the interior of the housing 54 into a pair of chambers 64 and 66 similar to the chambers 20 and 22. A plate means 68 is disposed in the chamber 66 and is supported in normally spaced relation with respect to the partition 60 by a plurality of tapered valve stem members 70 which are secured to the plate 68 in any suitable manner, and which extend through the ports 62 to provide alternate opened and closed positions thereof. Suitable helical spring members 72 are disposed around the outer periphery of each valve stem means 70 and is suitably anchored between the plate 68 and partition 60 for supporting the plate 68 in the normal position thereof whereby the valve stems 70 close the respective ports 62.

A centrally disposed sleeve 74 is provided in the cover means 56 and an actuator stem means 76 is slidably disposed within the sleeve 74. It is preferable to provide suitable sealing means, such as O-rings 76, between the outer periphery of the stem 76 and the inner periphery of the sleeve 74 for precluding leakage of fluid therebetween. The inwardly directed end of the stem 76 is provided with an axially extending threaded shank 80 for threaded engagement with a centrally disposed threaded bore 82 provided in the plate means 68 whereby reciprocation of the actuator stem means 76 will be transmitted to the plate 68. In addition, it is preferable to provide an access port 84 in the cover means 56 for receiving a removable plug means 86 therein. The plug means 86 may be removed from the port 84 in order to permit the injection or addition of a suitable fluid, such as water, into the chamber 66.

In use, the utensil 52 may be placed against the hot surface 48 for encasing or surrounding the pizza section 50 in much the same manner as in the use of the utensil 10. When it is desirable to add moisture into the chamber 64, the actuator stem means 76 may be manually depressed or moved in a direction toward the partition 60, whereupon the plate 68 is moved against the force of the springs 72. The valve stems 70 move simultaneously with the plate 68 for opening the communication between the chambers 74 and 66 through the ports 62. In this manner a controlled quantity of the moisturizing fluid may be injected into the chamber 64 for facilitating the cooking of the pizza section, as hereinbefore set forth.

From the foregoing, it will be apparent that the present invention provides a novel pizza cooking utensil for the rapid and efficient cooking of relatively small or single servings of pizza, thus rendering the popular food product feasible for serving in the usual fast food type eating establishment. The utensil comprises an open ended housing adapted to be positioned directly against the hot surface of a cooking grill, or the like, and encasing or surrounding the pizza section or serving to be cooked in the utensil. A moisture containing chamber is provided in the housing and in selective communication with the chamber encasing the pizza serving whereby moisture may be supplied to the atmosphere surrounding the pizza during the cooking operation, if desired. The pizza serving may be quickly cooked without the expense of constructing the usual relatively large pizza cover.

Whereas the present invention has been described in particular relation to the drawings attached hereto, it should be understood that other and further modifications apart from those shown or suggested herein may be made within the spirit and scope of this invention.

What is claimed is:

1. A pizza cooking utensil comprising a housing having one closed end and one open end adapted to be disposed on a hot cooking surface for providing a chamber to encase a pizza; a fluid reservoir chamber provided in the housing; valve means interposed between the fluid reservoir chamber and pizza encasing chamber to provide selected communication therebetween; actuator means operably connected with the valve means for opening thereof to establish communication between the fluid reservoir chamber and pizza encasing chamber whereby moisture may be selectively added to the pizza encasing chamber; the closed end of the housing being closed by removable cover means; a partition provided in the housing and interposed between the closed and open ends thereof to provide said fluid reservoir chamber; the valve means comprising normally closed valve means disposed in the partition, at least one tapered port provided in the partition, and spring urged tapered valve means reciprocally disposed within the tapered port for cooperation therewith to provide alternate open and closed communication between the fluid reservoir chamber and the pizza encasing chamber; and wherein the tapered valve means is carried by reciprocal plate means disposed within the fluid reservoir chamber and selectively movable against the force of the spring urged tapered valve means for providing the open communication between the fluid reservoir chamber and the pizza encasing chamber.

2. A pizza cooking utensil as set forth in claim 1 wherein the actuator means is operably connected with the reciprocal plate for moving the reciprocal plate means against the force of the spring urged tapered valve means.

3. A pizza cooking utensil as set forth in claim 2 wherein the actuator means comprises stem means secured to the reciprocal plate means and extending outwardly through the removable cover for access to manual actuation thereof.

* * * * *